Oct. 12, 1926.   1,603,231
R. BROADBENT
TIRE STRIPPING DEVICE
Filed July 23, 1923   2 Sheets-Sheet 1
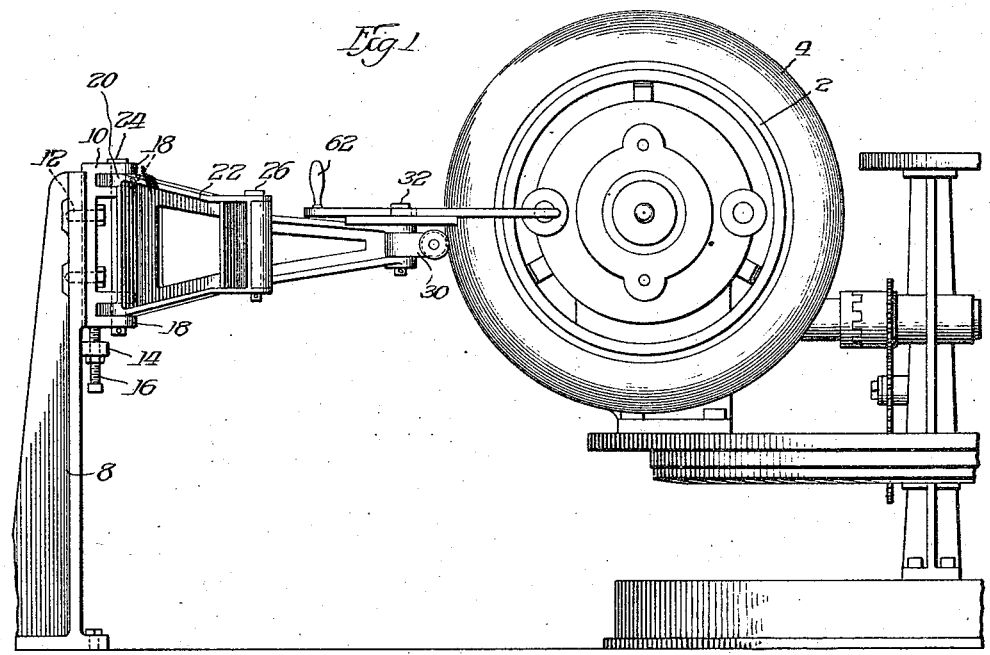
Inventor:
Roy Broadbent

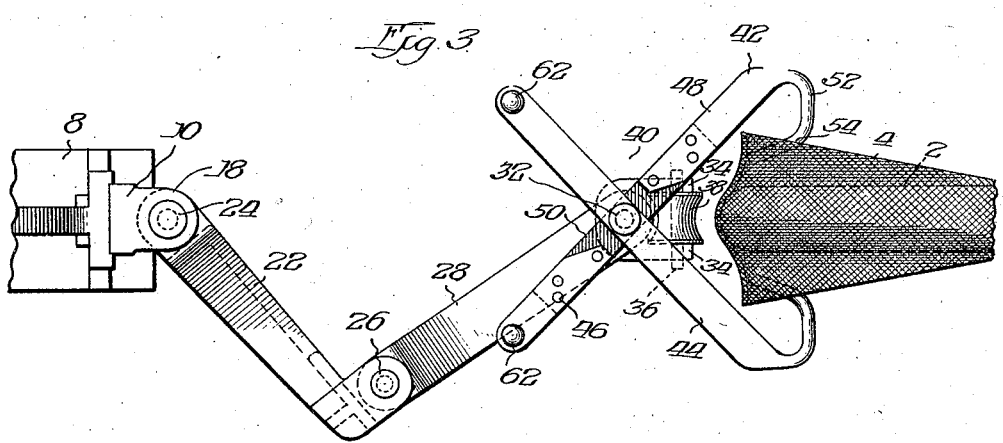
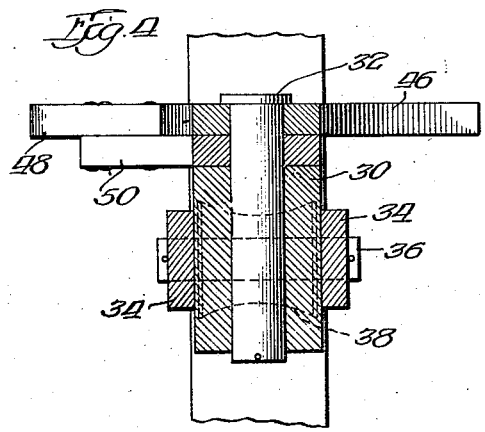
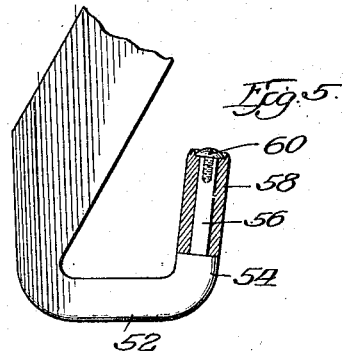

Patented Oct. 12, 1926.

1,603,231

UNITED STATES PATENT OFFICE.

ROY BROADBENT, OF HAMILTON, ONTARIO, CANADA, ASSIGNOR TO THE FIRESTONE TIRE AND RUBBER COMPANY, OF AKRON, OHIO, A CORPORATION OF OHIO.

TIRE-STRIPPING DEVICE.

Application filed July 23, 1923. Serial No. 653,179.

This invention relates to apparatus for stripping tires from cores on which they have been either built or vulcanized.

In the manufacture of pneumatic tires, the casing is formed by superimposing a plurality of fabric and rubber plies upon a metallic core which is usually coated with cement to cause the inner ply to cling thereto. After the vulcanizing operation, during which the tire has been molded to final form by heat and pressure, it is necessary to remove the tire from the core, an operation rendered extremely difficult by the shape of the mold body over which the beads of the tire must be drawn, and augmented by the gripping action of the cement upon the inner ply.

A broad feature of this present invention consists in a novel organization and arrangement of mechanism to loosen the tire casing from the core and strip it therefrom in a simple and efficient manner, requiring the expenditure of only a small amount of manual labor and avoiding any injury to the casing.

The various features of my invention will be best understood from a description of one embodiment thereof selected to illustrate the same, it being understood, however, that my invention is not limited to such selected embodiment and does not restrict the invention except within the limits of the claims attached hereto.

In the drawings:

Figure 1 is a side elevation of the apparatus illustrating a core and tire in operative position;

Figure 2 is a plan view illustrating the initial position of the tire removing tongs;

Figure 3 is a view similar to Figure 2 showing the final or open position of the loosening member;

Figure 4 is a cross-section on the line 4—4 of Figure 2; and

Figure 5 is a detail of one of the loosening elements.

In the type of machine with which my invention has been illustrated, a core 2 on which a tire casing 4 has been built is shown suspended in a vertical position upon a shaft 6 suitably connected to any convenient source of power and driven at any desirable speed.

A standard 8 is provided, upon the upper end of which is a bracket 10 suitably shaped and constructed to support the various parts of the stripping device. The bracket 10 is received in a vertical groove in the standard and is secured thereto by bolts 12 extending through elongated slots in the bracket. Below the bracket the standard is provided with an intergral lug 14 having a threaded aperture therein through which an adjustment screw 16 extends to bear upon the bottom face of the bracket and by means of which the desired vertical position of the bracket may be secured.

The bracket 10 is provided with spaced ears 18 between which are received bearing lugs 20 of a swinging frame 22, a bolt 24 extending through the ears and lugs to hold the frame in position and about which the frame is free to pivot in a horizontal plane. Carried by a vertical pivot 26 upon the forward end of the frame 22 is a second frame 28 bifurcated at its free end to receive a block 30. A vertical stud 32 extends through the arms of the frame and the block to retain the latter in its seat and allow it to turn in a horizontal plane. The block 32 is provided with spaced lugs 34 through which a horizontal pin 36 extends, which serves as the axis for a pressure and guide roll 38 adapted to engage the tread surface of the tire. The stud 32 extends above the top of the frame 28 and affords a pivot for tongs 40 consisting of the crossed lever arms 42 and 44. The lever arm 42 is in two sections, 46 and 48, connected together by a strap 50, the arrangement allowing the two lever arms to operate in the same horizontal plane.

The forward end of each arm has an inwardly extending portion 52 terminating in a rearwardly bent tire loosening member 54. The loosening member is preferably provided with a reduced portion 56 upon which an anti-friction roller 58 is secured by a screw 60.

Upon the opposite ends of the lever arms from the tire loosening rollers are handles 62 as a convenient means for actuating the tongs.

In the use of the device, the core and tire casing thereon are set in rotation by throwing in the core driving clutch. The stripping device is now swung toward the tire, it being recognized that the pivotal mountings of the frames 22 and 28 will allow the device to assume proper position with relation to the tire regardless of the size of the latter. The tire loosening and stripping rollers 58 being separated a distance sufficient to receive the tire therebetween, the stripping device is moved into operative position, the engagement of the roller with the tread of the tire arresting the forward movement of the device and centering it with relation to the core. The stripping rollers are then brought into engagement with the beads of the tire by operating the handles 62, the inclination of the rollers being such as to enable them to pry between the beads of the tire and the core. By a combined pulling and separating movement of the rollers, the tire is completely loosened from the core at all points in the manner clearly illustrated in Figure 3. After the tire has been loosened in the above manner, a movement of the tongs 40 transversely of the core will strip the tire therefrom, although, generally, the latter has been so loosened and stretched as to be easily removable by hand, if desired.

Having described my invention, what I claim as new and desire to secure by Letters Patent of the United States is:

1. Apparatus for stripping tires from cores having, in combination, a core support, pivotally mounted rollers for engaging the beads of a tire on the core, means for moving the said rollers about their pivot to loosen the tire from the core, and a guide roller adapted to engage the tread of the tire and centralize the said rollers with respect to the tire.

2. Apparatus for stripping tires from cores having, in combination, a pair of arms pivoted together and extending on opposite sides of the core, means on the ends of the arms adapted to loosen the tire from the core, tire engaging means to locate the loosening means in predetermined position relative to the beads of the tire, and means for causing the loosening means to move transversely and radially of the tire to strip the tire from the core.

3. An apparatus for stripping tires from cores having, in combination, tire gripping tongs for prying a tire from the core, said tongs being mounted for swinging movement in a horizontal plane, and means for operating the tongs.

4. An apparatus for stripping tires from cores having, in combination, a pivoted frame, a guide roll carried by said frame for engaging the tread of the tire, a pair of arms mounted on said frame above the roll, said arms extending on opposite sides of the core, and tire engaging rollers upon the ends of the said arms adapted to loosen the tire from the core.

5. An apparatus for stripping tires from cores having, in combination, a core support, a pivoted frame, a second frame pivoted to the first frame, a tire stripping device mounted upon the second frame, and means for centralizing the stripping device in operative position with respect to the core.

6. An apparatus for stripping tires from cores having, in combination, a swinging support, a pair of crossed arms pivoted to said support and adapted to operate in the same plane, operating means on one end of said arms, and tire loosening means on the other end of the arms arranged on opposite sides of the core, the said support being mounted for universal movement in a horizontal plane to locate the tire loosening means in tire engaging position and facilitate the removal of the tire.

ROY BROADBENT.